United States Patent Office.

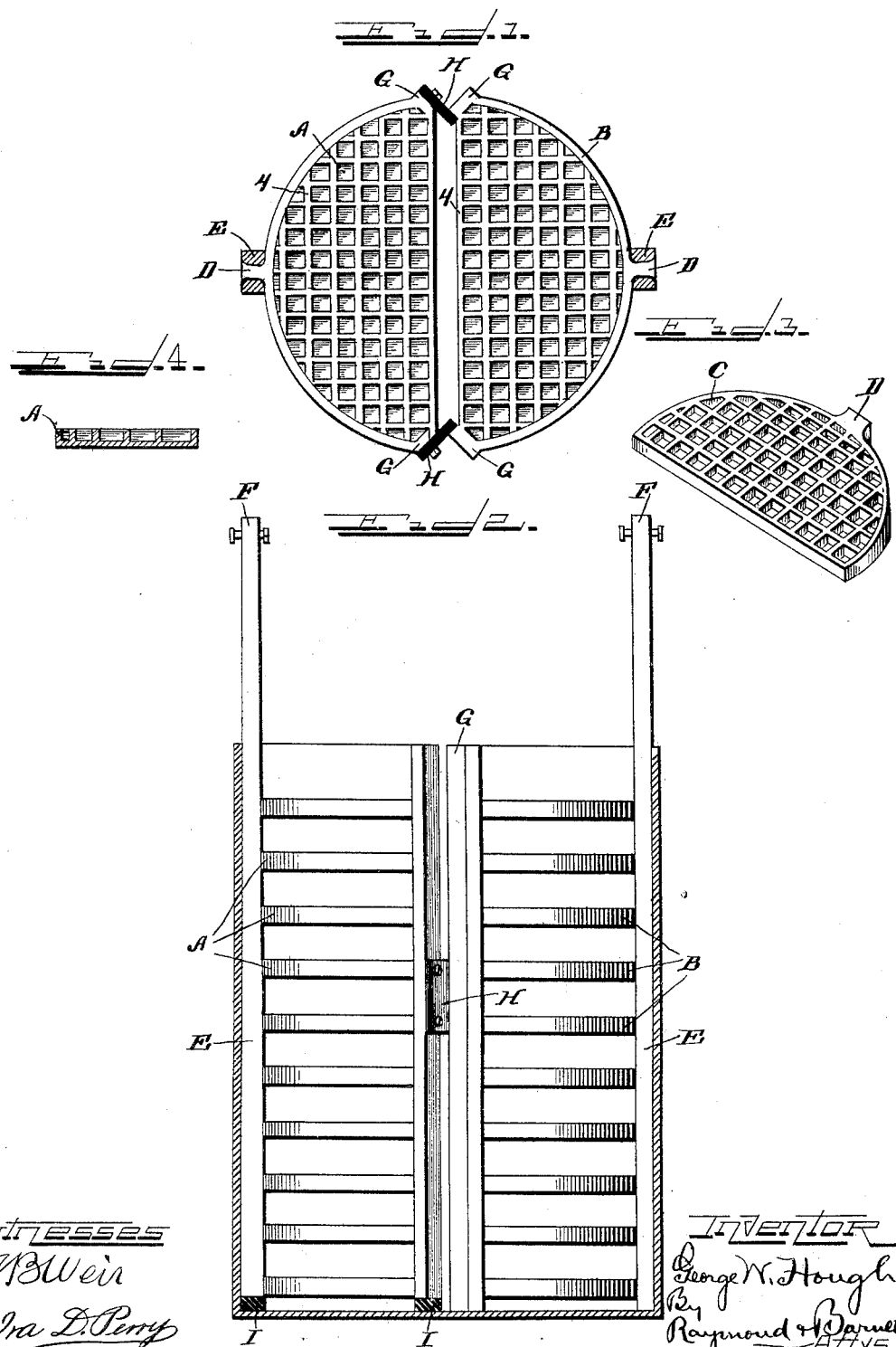

GEORGE W. HOUGH, OF EVANSTON, ILLINOIS.

STORAGE BATTERY.

SPECIFICATION forming part of Letters Patent No. 675,600, dated June 4, 1901.

Application filed December 20, 1900. Serial No. 40,469. (No model.)

*To all whom it may concern:*

Be it known that I, GEORGE W. HOUGH, a citizen of the United States, residing at Evanston, in the county of Cook and State of Illinois, have invented certain new and useful Improvements in Storage Batteries, of which the following is a specification.

This invention relates to improvements in that class of storage batteries in which the active material is applied to plates suitably constructed of lead alloy which are submerged in an electrolytic fluid, and has for its primary object to insure a high coefficient as between the charge and discharge, to produce a strong and durable battery, to eliminate as far as possible the danger of short-circuiting resulting from the dislodgment of the active material by providing plates of a character that will firmly and permanently retain the active material in place, and to avoid the necessity for the employment of separators as between the plates or elements of the battery.

Other objects are to produce a strong and compact battery and one especially adapted for stationary use, although also adapted for portable use, as upon motor-vehicles; also, to provide a novel and economical form of plate or grid to support the active material, and to provide for the formation of a substantial and rigid pile therefrom without the use of separators between the plates forming the pile, and to provide certain other novel features, all as illustrated in the accompanying drawings, in which—

Figure 1 represents a plan view of a pile of plates for a storage battery embodying my invention. Fig. 2 represents a side elevation thereof, showing the same in a cell, which is shown in section. Fig. 3 is a perspective view of one of the plates or grids, and Fig. 4 is a sectional view thereof.

Similar letters of reference indicate the same parts in the several figures of the drawings.

I prefer to form the plates of my battery in a pile of substantially circular form, although obviously the form of the plates, as well as the dimensions thereof, may vary to any desired extent; but the circular pile affords a compact and most satisfactory arrangement of the plates of the battery, as I have found from the use of a battery so constructed. I also prefer to form the plates of each pile substantially semicircular in shape, as illustrated in the drawings, although if the battery as a whole be square or other form the individual plates forming the pile may be square, rectangular, or of such other form that when combined will produce the desired shape of pile.

Referring now to the drawings, let A represent the plates forming the negative side of the pile, and B the plates forming the opposite side of the pile, of which plates there may be any desired number, spaced a suitable distance apart to afford free access of the electrolytic fluid to the active material supported by the plates. All of the plates of a pile are of the same form and dimensions, and each plate is substantially a cup, as will more fully appear by an inspection of Fig. 4, being in the form of a shallow pan which is preferably divided by a series of crossing ribs C into any desired number of pockets or recesses to receive the active material, which may be applied in the form of a paste or powder or otherwise produced, as is common and well understood in this art.

The ribs C may extend across the cup-plates in any direction desired to form any shaped cups or cells thereon and may be of any desired number, according to the proportion of lead alloy forming the plate and the active material which it is desired to secure. The cells of the plates are filled flush with the upper edge thereof with the active material, and the plates are preferably set in a horizontal position, as illustrated in Fig. 2, in which position it is practically impossible for the active material to fall out of or become dislodged from the plates.

Instead of placing separators between the plates of a pile, which is necessary in the ordinary form of batteries of this class, where the plates are set on edge with the positive plates alternating with the negative plates, I propose to form my piles of plates separately, and to this end each plate is first cast in the form shown in Fig. 3, with the projection D thereon. The plates after being filled with the active material are arranged side by side in a suitable casting-mold and are then united by casting the bar E, which not only electrically connects all of the plates of a pile and firmly separates and supports them, but may be extended beyond the end plate of the pile, so as to afford a rest for the pile at the bottom and a terminal or binding post F at the top outside of the cell, in which the pile is placed. I then cast on each corner of the plates the bars G, which fuse with and also electrically connect the plates as well as forming a means for firmly separating and supporting the plates, such bars being extended at the bottom a distance corresponding with the extension of the bar E to support the lower plate of the pile above the bottom of the cell. Both the positive and the negative piles are formed in the same way. Then when the piles are ready to be placed in a cell for service I secure, by screwing or otherwise to the corner-posts G of one of the piles, preferably the negative pile, a block or strip H of insulating material, which projects beyond the posts to which they are attached and serves to hold the corner-posts G, as well as the plates of the positive and negative piles, out of electrical contact with each other. It will also be found desirable to attach to or place under the posts E and G of the negative pile blocks of insulating material I, which will be of especial advantage when the battery is used portably, during which the wash of the electrolytic fluid may possibly deposit some of the active material upon the bottom of the cell. I prefer to attach both the insulating-blocks H and I to the negative pile of the battery, because that pile is practically indestructible, especially as the form of the plates and the piles of the battery permits of the use of any desired proportion of lead and active material and dispenses with the employment of the usual separators, which greatly add to the weight as well as the bulk of the battery.

My battery is especially adapted for stationary purposes, where great efficiency is especially desirable and the weight is of small consequence, and by having the plates cup-shaped and rigidly connected and supported, so that they cannot change relative position whether in or out of their cells, the active material will be permanently retained within the cup-plates with but slight possibility of being dislodged and deposited on the bottom of the cell, while separators would neither be useful nor necessary, as they are with the ordinary form of battery-plate, to retain the active material in place.

My invention possesses many advantages over the prior art that will readily suggest themselves to one skilled in the art and the form in which it may be embodied may vary widely from that shown and described without departing from the spirit of my invention, and all such variations would therefore fall within the purview of my invention.

Having thus fully described my invention, what I claim, and desire to secure by Letters Patent, is—

A storage battery comprising a positive and a negative element, independent of each other each element consisting of a pile of non-perforated cup-plates composed of lead alloy for containing the active material, the plates of each pile being of the same shape and dimensions and arranged one above the other and each being provided with a projection on one side thereof, a bar cast upon and connecting all of said projections and terminating in a binding-post, one or more bars cast upon and connecting said plates at other points, and blocks or strips of insulating material secured to one of said piles or elements and bearing against the others so as to maintain the piles in electric separation, substantially as described.

GEORGE W. HOUGH.

Witnesses:
JAMES H. RAYMOND,
F. H. DRURY.